US010621935B2

United States Patent
Xu

(10) Patent No.: US 10,621,935 B2
(45) Date of Patent: Apr. 14, 2020

(54) HVA WIRING METHOD BASED ON GOA CIRCUIT

(71) Applicant: Shenzhen China Star Optoelectronics Technology Co., Ltd., Shenzhen, Guangdong (CN)

(72) Inventor: Xiangyang Xu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 376 days.

(21) Appl. No.: 15/562,795

(22) PCT Filed: Jul. 21, 2017

(86) PCT No.: PCT/CN2017/093771
§ 371 (c)(1),
(2) Date: Sep. 28, 2017

(87) PCT Pub. No.: WO2019/000517
PCT Pub. Date: Jan. 3, 2019

(65) Prior Publication Data
US 2020/0043429 A1 Feb. 6, 2020

(30) Foreign Application Priority Data
Jun. 30, 2017 (CN) .......................... 2017 1 0519116

(51) Int. Cl.
*G09G 5/00* (2006.01)
*G09G 3/36* (2006.01)
(Continued)

(52) U.S. Cl.
CPC ....... *G09G 3/3648* (2013.01); *G02F 1/13306* (2013.01); *G02F 1/133711* (2013.01); *G02F 2001/133715* (2013.01)

(58) Field of Classification Search
CPC .... G09G 3/2085; G09G 3/3648; G09G 3/367; G09G 3/3674; G09G 3/3677;
(Continued)

(56) References Cited

U.S. PATENT DOCUMENTS 9,501,989 B2 * 11/2016 Xiao .................. G11C 19/28
10,127,878 B1 * 11/2018 Lv .................... G11C 19/28
(Continued)

FOREIGN PATENT DOCUMENTS

| CN | 105469736 A | 4/2016 |
| CN | 106328084 A | 1/2017 |
| CN | 106548740 A | 3/2017 |

OTHER PUBLICATIONS

Translation of Chinese Publication No. CN105469736 A, Apr. 6, 2016, 13 pages.*
(Continued)

*Primary Examiner* — Joe H Cheng

(57) ABSTRACT

An HVA wiring method based on a GOA circuit is disclosed. A direct-current low voltage input end and a reset signal input end are connected to a first signal providing end, and the first signal providing end is configured to provide a direct-current low voltage signal to the direct-current low voltage input end and to provide a reset signal to the reset signal input end. When the HVA wiring method is used, the GOA circuit in which the reset signal is added can share the existing HVA jigs.

12 Claims, 5 Drawing Sheets

(51) Int. Cl.
*G02F 1/133* (2006.01)
*G02F 1/1337* (2006.01)

(58) Field of Classification Search
CPC ......... G09G 3/3696; G09G 2310/0286; G09G 2310/08; G11C 16/28; G11C 16/287; G02F 1/13306; G02F 1/133711; G02F 2001/133715; H03K 3/012; H03K 5/01
See application file for complete search history.

(56) References Cited

U.S. PATENT DOCUMENTS

| | | | |
|---|---|---|---|
| 10,332,468 B2* | 6/2019 | Xu | G09G 3/3677 |
| 2010/0150302 A1* | 6/2010 | Tsai | G11C 19/28 |
| | | | 377/79 |
| 2012/0133574 A1* | 5/2012 | Wu | G09G 3/20 |
| | | | 345/55 |
| 2015/0171833 A1 | 6/2015 | Pi et al. | |
| 2016/0307531 A1* | 10/2016 | Xiao | G09G 3/3677 |
| 2016/0358666 A1* | 12/2016 | Pang | G11C 19/287 |
| 2017/0287428 A1* | 10/2017 | Xue | G09G 3/3677 |
| 2018/0374442 A1* | 12/2018 | Hao | G11C 19/28 |
| 2019/0019471 A1* | 1/2019 | Zeng | G02F 1/1368 |
| 2019/0096348 A1* | 3/2019 | Xu | G09G 3/3677 |
| 2019/0272795 A1* | 9/2019 | Xu | G09G 3/36 |

OTHER PUBLICATIONS

Translation of Chinese Publication No. CN106328084 A, Jan. 11, 2017, 7 pages.*
International Search Report dated Mar. 28, 2018 for International Patent Application No. PCT/CN2017/093771.

* cited by examiner

HVA WIRING METHOD BASED ON GOA CIRCUIT

CROSS REFERENCE TO RELATED APPLICATIONS

This application is a national stage of PCT/CN2017/093771, filed on Jul. 21, 2017, which is based upon and claims priority to Chinese Patent Application No. 201710519116.X, filed on Jun. 30, 2017, and the entire contents thereof are incorporated herein by reference.

FIELD OF THE INVENTION

The present disclosure relates to the technical field of liquid crystal display device, and particularly to an HVA wiring method based on a GOA circuit.

BACKGROUND OF THE INVENTION

Liquid Crystal Display (LCD) is one of widely used flat display devices. An LCD comprises two substrates on which electric field generation electrodes are arranged, such as pixel electrode and common electrode, and a liquid crystal (LC) layer arranged between the two substrates. A voltage is applied to the electric field generation electrodes, and thus an electric field can be generated in the LC layer. The electric field determines orientations of liquid crystal molecules in the liquid crystal layer, and polarization state of light irradiating the liquid crystal layer can be regulated, so that an image can be displayed on the LCD.

At present, a Polymer Stabilized Vertical Alignment (PSVA) technology is developed in the industry. According to the PSVA technology, a monomer with a proper concentration is doped into a liquid crystal material, and the mixture is shaken to make it uniform. Then, the mixed liquid crystal material is heated by a heater to reach an isotropy state. When the liquid crystal mixture drops to room temperature, it will return to a nematic state. Next, the liquid crystal mixture is filled into a liquid crystal cell and is applied with a voltage. When the voltage enables the liquid crystal molecules to be aligned in a stable state, ultraviolet or heat is applied to the monomer so that the monomer experiences polymerization reaction to form a polymer layer, so as to realize stable alignment of the liquid crystal. In an existing PSVA circuit, a shorting bar circuit is added surrounding a bonding region, and terminal area of the shorting bar circuit is cut by laser after the alignment procedure is completed.

Gate Driver On Array (GOA) circuit is a technology in which a gate row scanning driving signal circuit is manufactured on an array substrate during an array manufacturing procedure of a Thin Film Transistor (TFT) LCD, so as to realize a row-by-row scanning driving mode of gate lines. Compared with traditional flexible circuit board and glass circuit board, not only a manufacturing cost of the GOA circuit can be saved, but also a bonding procedure in a gate direction thereof can be saved, which can facilitate the improvement of production capacity and integration level of the display device.

FIG. 1 schematically shows a GOA circuit in the prior art. The GOA circuit comprises a pull-up control module (T11), a pull-up module (T21), a pull-down module (T31 and T41), a first pull-down holding module (T51/T52/T53/T54/T32/T42), and a second pull-down holding module (T61/T62/T63/T64/T33/T43). When G(n−3) is in a high level, Q(n) is charged and pulled up. At this time, T21 is turned on. CLK high electric potential will pull up G(n), and a high level scanning signal is output. When G(n+3) is in a high level, the pull-down module will pull down an electric potential of G(n) and that of Q(n). A work electric potential of the pull-down holding module is a low electric potential of Q(n) and a high electric potential of LC1 (or LC2). A control time sequence of the GOA circuit is shown in FIG. 2. LC1 and LC2 are low-frequency signals with period twice a frame period, and a duty ratio thereof is ½. A phase difference between LC1 and LC2 is ½ the period. A pull-down holding module 1 and a pull-down module 2 are driven by LC1 and LC2 alternately.

With respect to a traditional liquid crystal panel with a GOA circuit, when a driving frequency is switched, frame-drop (CLK pulse missing) phenomenon would possibly occur, which will generate an overcurrent in the panel. At this time, an overcurrent protection function will be triggered, and the panel will automatically shut down. In order to alleviate the overcurrent resulted by frame-drop, a reset TFT can be added to point Q at each stage of GOA circuit, as shown in FIG. 3. The gates of all reset TFTs are all connected to one reset signal. The reset signal provides a high electric potential after each frame signal comes to an end so as to pull down electric potential of points Q of all GOA units. However, if the reset signal is added, jigs of manufacturing procedure of High Vertical Alignment (HVA) circuit cannot be shared, and thus a new method is urgently needed to solve the technical problem.

SUMMARY OF THE INVENTION

The present disclosure provides an HVA wiring method based on a GOA circuit, so as to solve the technical problem that jigs of manufacturing procedure of High Vertical Alignment (HVA) circuit cannot be shared when the reset signal is added.

The present disclosure provides an HVA wiring method based on a GOA circuit, wherein the GOA circuit comprises a plurality of GOA sub-circuits that are in cascade connection to one another, and each GOA sub-circuit comprises a pull-up control unit, a pull-up unit, a transfer unit, a pull-down unit, a pull-down holding unit, a bootstrap unit, and a reset unit, wherein the pull-up control unit is connected to a first signal input end, a second signal input end and a first node, and is configured to output a voltage signal of the second signal input end to the first node under control of the first signal input end;

wherein the pull-up unit is connected to a high-frequency clock signal input end, a first signal output end and the first node, and is configured to input a clock signal of the high-frequency clock signal input end to the first signal output end:

wherein the transfer unit is connected to the high-frequency clock signal input end, the first node and a second signal output end, and is configured to provide a voltage signal to a second signal input end of another stage of GOA sub-circuit;

wherein the pull-down holding unit is connected to the first node, a direct-current low voltage input end, a first low-frequency clock signal input end, a second low-frequency clock signal input end and the first signal output end, and is configured to hold an output signal of the first signal output end in a low level state;

wherein the bootstrap unit is connected to the first node and the first signal output end, and is configured to uplift a voltage of the first node;

wherein the pull-down unit is connected to the first node, the first signal output end, a third signal input end and the direct-current low voltage input end, and is configured to pull down an output signal of the first signal output end to a low level state; and wherein the reset unit comprises a reset TFT, and a gate, a drain, and a source of the reset TFT are respectively connected to a reset signal input end, the first node, and the direct-current low voltage input end; and wherein the method comprises connecting the direct-current low voltage input end and the reset signal input end to a first signal providing end, the first signal providing end being configured to provide a direct-current low voltage signal to the direct-current low voltage input end and to provide a reset signal to the reset signal input end.

Preferably, the first signal providing end provides an adjustable direct-current signal in a range from 0 V to 25 V.

Preferably, the method further comprises connecting the high-frequency clock signal input end to a second signal providing end, wherein the second signal providing end is configured to provide a high-frequency clock signal to the high-frequency clock signal input end.

Preferably, the second signal providing end provides an adjustable direct-current signal in a range from 0 V to 25 V.

Preferably, the second signal providing end provides a −5 V direct-current signal.

Preferably, the method further comprises connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

Preferably, the third signal providing end provides an adjustable direct-current signal in a range from 0 V to 25 V.

Preferably, the third signal providing end provides a −5 V direct-current signal.

According to the HVA wiring method based on the GOA circuit provided herein, the direct-current low voltage signal and the reset signal both are provided by the first signal providing end. Therefore, when the aforesaid HVA wiring method is used, the GOA circuit in which the reset signal is added can share jigs with existing HVA circuit. That is, the HVA jigs of the GOA circuit in which the reset signal is added and the HVA jigs of the GOA circuit in which no reset signal is added can be shared.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

Figure 1:
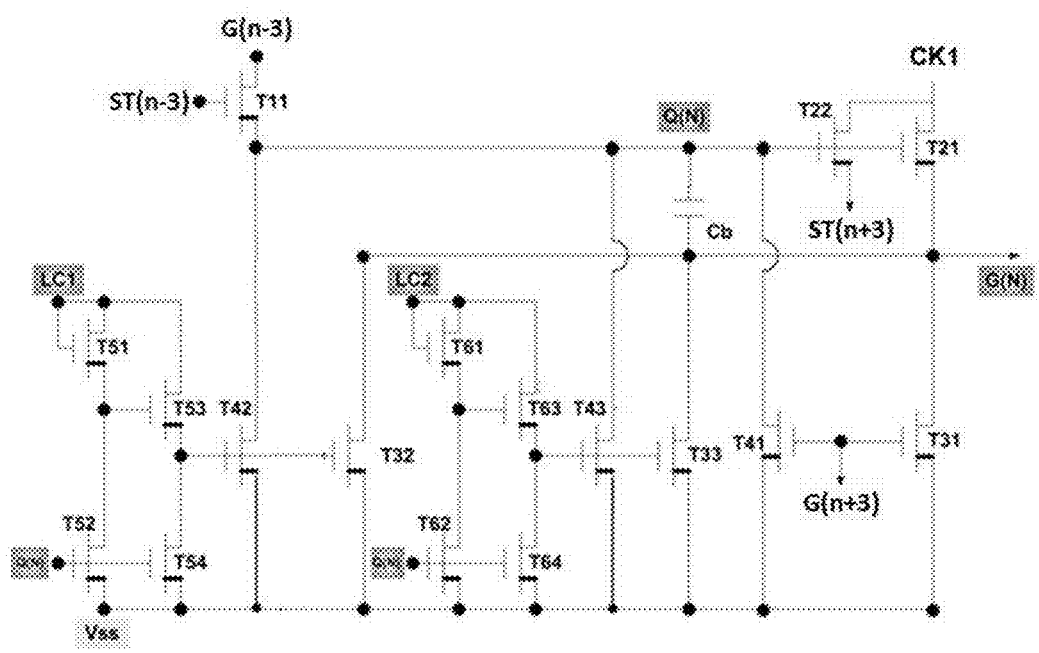
FIG. 1 schematically shows a structure of a GOA circuit in the prior art.
Figure 2:
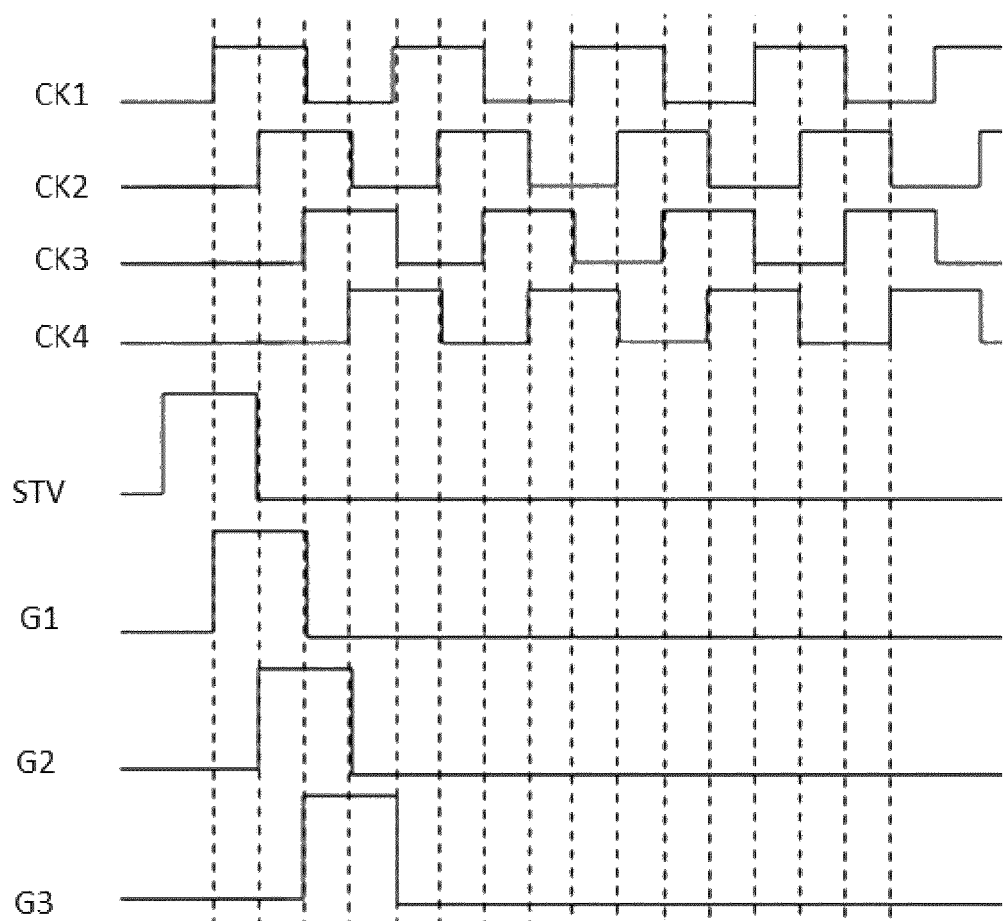
FIG. 2 is a time sequence diagram of signals of the GOA circuit as shown in FIG. 1.
Figure 3:
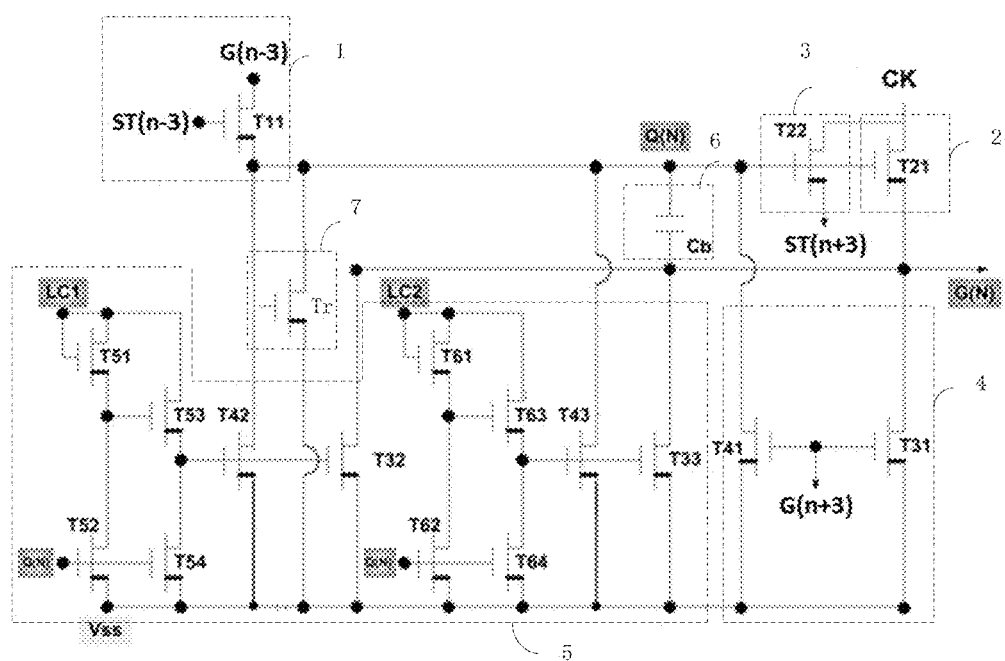
FIG. 3 schematically shows a structure of another GOA circuit in the prior art.
Figure 4:
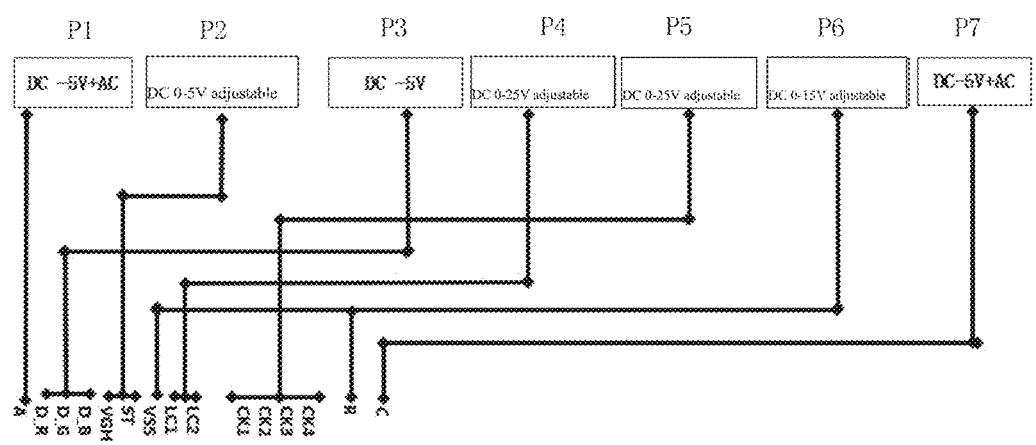
FIG. 4 schematically shows wirings according to an HVA wiring method based on a GOA circuit provided by one embodiment of the present disclosure.

FIG. 4 schematically shows wirings according to an HVA wiring method based on a GOA circuit provided by one embodiment of the present disclosure. As shown in FIG. 4, the present disclosure provides an HVA wiring method based on a GOA circuit. The GOA circuit comprises a plurality of GOA sub-circuits that are in cascade connection to one another, and each GOA sub-circuit comprises a pull-up control unit 1, a pull-up unit 2, a transfer unit 3, a pull-down unit 4, a pull-down holding unit 5, a bootstrap unit 6, and a reset unit 7.

The pull-up control unit 1 is connected to a first signal input end G(n−3), a second signal input end ST(n−3) and a first node Q(N), and is configured to output a voltage signal of the second signal input end ST(n−3) to the first node Q(N) under control of the first signal input end. G(n−3) The pull-up unit 2 is connected to a high-frequency clock signal input end CK, a first signal output end G(N) and the first node Q(N), and is configured to input a clock signal of the high-frequency clock signal input end CK to the first signal output end G(N). The transfer unit 3 is connected to the high-frequency clock signal input end CK, the first node Q(N) and a second signal output end ST(n+3), and is configured to provide a voltage signal to a second signal input end ST(n−3) of another stage of GOA sub-circuit. The pull-down holding unit 5 is connected to the first node Q(N), a direct-current low voltage input end VSS, a first low-frequency clock signal input end LC1, a second low-frequency clock signal input end LC2 and the first signal output end G(N), and is configured to hold an output signal of the first signal output end G(N) in a low level state. The bootstrap unit 6 is connected to the first node Q(N) and the first signal output end G(N), and is configured to uplift a voltage of the first node Q(N). The pull-down unit 4 is connected to the first node Q(N), the first signal output end G(N), a third signal input end G(n+3) and the direct-current low voltage input end. VSS, and is configured to pull down an output signal of the first signal output end G(N) to a low level state. The reset unit 7 comprises a reset thin film transistor Tr, and a gate, a drain, and a source of the reset thin film transistor Tr are respectively connected to a reset signal input end (not shown in FIG. 4), the first node Q(N), and the direct-current low voltage input end VSS.

The method comprises connecting the direct-current low voltage input end VSS and the reset signal input end to a first signal providing end, wherein the first signal providing end is configured to provide a direct-current low voltage signal to the direct-current low voltage input end VSS and to provide a reset signal to the reset signal input end.

Specifically, the pull-up control unit 1 is connected to a first signal input end G(n−3), a second signal input end ST(n−3) and a first node Q(N), and is configured to output a voltage signal of the second signal input end ST(n−3) to the first node Q(N) under control of the first signal input end G(n−3). The pull-up unit 2 is connected to a high-frequency clock signal input end CK, a first signal output end G(N) and the first node Q(N), and is configured to input a clock signal of the high-frequency clock signal input end CK to the first signal output end G(N).

The transfer unit 3 is connected to the high-frequency clock signal input end CK, the first node Q(N) and a second signal output end ST(n+3), and is configured to provide a voltage signal to a second signal input end ST (n−3), of another stage of GOA sub-circuit.

The pull-down holding unit 5 is connected to the first node Q(N), a direct-current low voltage input end VSS, a first low-frequency clock signal input end LC1, a second low-frequency clock signal input end LC2 and the first signal output end G(N), and is configured to hold an output signal of the first signal output end G(N) in a low level state.

The bootstrap unit 6 is connected to the first node Q(N) and the first signal output end G(N), and is configured to uplift a voltage of the first node Q(N).

The pull-down unit 4 is connected to the first node Q(N), the first signal output end G(N), a third signal input end G(n+3) and the direct-current low voltage input end VSS, and is configured to pull down an output signal of the first signal output end G(N) to a low level state.

The reset unit 7 comprises a reset thin film transistor Tr, and a gate, a drain, and a source of the reset thin film transistor Tr are respectively connected to a reset signal input end, the first node Q(N), and the direct-current low voltage input end VSS.

As shown in FIG. 4, the HVA wiring method based on the GOA circuit comprises connecting the direct-current low voltage input end VSS and the reset signal input end to a first signal providing end, wherein the first signal providing end is configured to provide a direct-current low voltage signal to the direct-current low voltage input end VSS and to provide a reset signal to the reset signal input end.

According to the present embodiment, one reset thin film transistor Tr is added to each stage of GOA unit of the GOA circuit. After each frame image is refreshed, Q points of all stages of GOA units are simultaneously reset. Gates of Tr of all GOA units are all connected to one reset signal input end, and the reset signal input end and the direct-current low voltage input end VSS share I-IVA shorting bar wiring.

The direct-current low voltage signal and the reset signal both are provided by the first signal providing end. The first signal providing end can be a port of the HVA and the port can provide the direct-current low voltage signal and the reset signal. Therefore, when the aforesaid HVA wiring method is used, the GOA circuit in Which the reset signal is added can share jigs with existing HVA circuit. That is, the HVA jigs of the GOA circuit in which the reset signal is added and the HVA jigs of the GOA circuit in which no reset signal is added can be shared.

According to a specific embodiment of the present disclosure, the first signal providing end provides an adjustable direct-current signal in a range from 0 V to 25 V.

According to a specific embodiment of the present disclosure, the method further comprises connecting the high-frequency clock signal input end to a second signal providing end, wherein the second signal providing end is configured to provide a high-frequency clock signal to the high-frequency clock signal input end.

According to a specific embodiment of the present disclosure, the second signal providing end provides an adjustable direct-current signal in a range from 0 V to 25 V.

According to a specific embodiment of the present disclosure, the method further comprises connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

According to a specific embodiment of the present disclosure, the third signal providing end provides an adjustable direct-current signal in a range from 0 V to 25 V.

As shown in FIG. 4, A represents a common electrode of an array substrate; D_R/D_G/D_B respectively represent data signals of a red sub pixel, a green sub pixel, and a blue sub pixel; VGH/ST/VSS/LC1/LC2/CK1/CK2/CK3/CK4 are control signals of the GOA circuit; and C represents a common electrode of a color filter substrate. During HVA manufacturing procedure. A is connected to P1 (port), which provides an superposed signal of a −5 V direct-current signal and an alternating current signal; VGH/ST is connected to P2 (port), which provides 0−5 V adjustable direct-current signal; D_R/D_G/D_B is connected to P3 (port), which provides −5 V direct-current signal; LC1 and LC2 are connected to P4 (i.e., the third signal providing end), which provides 0−25 V adjustable direct-current signal; CK1/CK2/CK3/CK4 is connected to P5 (i.e., the second signal providing end), which provides 0−25 V adjustable direct-current signal; VSS is connected to P6 (i.e., the first signal providing end), which provides 0−15 V adjustable direct-current signal; and C is connected to P7 (port), which provides an superposed signal of a −5 V direct-current signal and an alternating current signal.

When the aforesaid HVA wiring method is used, the GOA circuit in which the reset signal is added not only can share the existing HVA jigs, but also can share time sequence with a panel comprising an existing GOA circuit.

Figure 5:
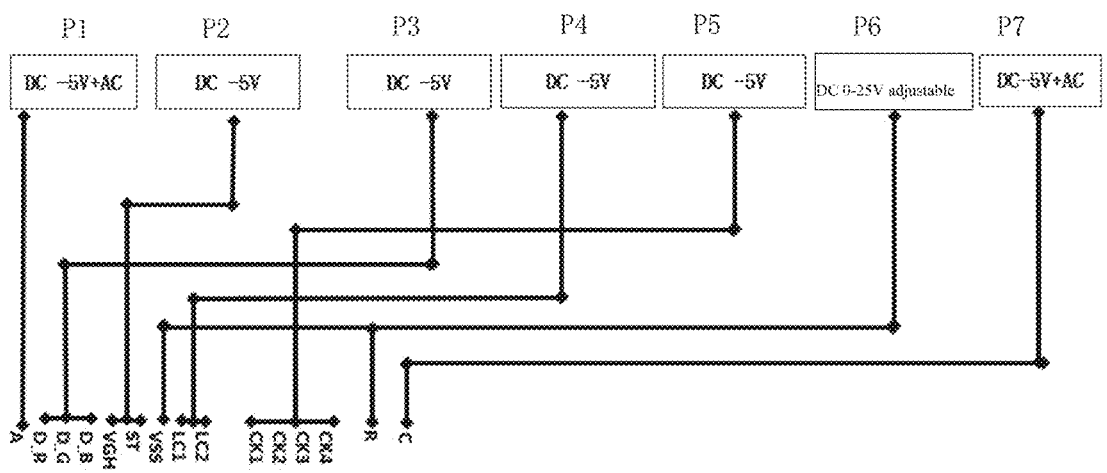
FIG. 5 schematically shows wirings according to an HVA wiring method based on a GOA circuit provided by the other embodiment of the present disclosure.

As shown in FIG. 5, according to a specific embodiment of the present disclosure, the reset signal input end and the direct-current low voltage input end VSS share a shorting bar, and signals are provided in a following manner. A is connected to P1 (port), which provides an superposed signal of a −5 V direct-current signal and an alternating current signal; VGH/ST is connected to P2 (port), which provides −5 V direct-current signal; D_R/D_G/D_B is connected to P3 (port), which provides −5 V direct-current signal; the first low-frequency clock signal input end LCI and the second low-frequency clock signal input end LC2 are connected to P4 (i.e., the third signal providing end), which provides −5 V direct-current signal; CK1/CK2/CK3/CK4 is connected to P5 (i.e., the second signal providing end), which provides −5 V direct-current signal; the direct-current low voltage input end VSS is connected to P6 (i.e., the first signal providing end), which provides 0−25 V adjustable direct-current signal; and C is connected to P7 (port), which provides an superposed signal of a −5 V direct-current signal and an alternating current signal, When the aforesaid HVA wiring method is used, not only the GOA circuit in which the reset signal is added can share the existing HVA jigs, but also a more simple HVA manufacturing time sequence provided by the present embodiment can be used so as to increase an HVA manufacturing margin.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. An HVA wiring method based on a GOA circuit, wherein the GOA circuit comprises a plurality of GOA sub-circuits that are in cascade connection to one another, and each GOA sub-circuit comprises a pull-up control unit, a pull-up unit, a transfer unit, a pull-down unit, a pull-down holding unit, a bootstrap unit, and a reset unit, wherein the pull-up control unit is connected to a first signal input end, a second signal input end and a first node, and is configured to output a voltage signal of the second signal input end to the first node under control of the first signal input end;

wherein the pull-up unit is connected to a high-frequency clock signal input end, a first signal output end and the first node, and is configured to input a clock signal of the high-frequency clock signal input end to the first signal output end;

wherein the transfer unit is connected to the high-frequency clock signal input end, the first node and a second signal output end, and is configured to provide a voltage signal to a second signal input end of another stage of GOA sub-circuit;

wherein the pull-down holding unit is connected to the first node, a. direct-current low voltage input end, a first low-frequency clock signal input end, a second low-frequency clock signal input end and the first signal output end, and is configured to hold an output signal of the first signal output end in a low level state;

wherein the bootstrap unit is connected to the first node and the first signal output end, and is configured to uplift a voltage of the first node;

wherein the pull-down unit is connected to the first node, the first signal output end, a third signal input end and the direct-current low voltage input end, and is configured to pull down an output signal of the first signal output end to a low level state; and wherein the reset unit comprises a reset TFT, and a gate, a drain, and a source of the reset TFT are respectively connected to a reset signal input end, the first node, and the direct-current low voltage input end; and wherein the method comprises connecting the direct-current low voltage input end and the reset signal input end to a first signal providing end, the first signal providing end being configured to provide a direct-current low voltage signal to the direct-current low voltage input end and to provide a reset signal to the reset signal input end.

2. The method according to claim 1, wherein the first signal providing end provides an adjustable direct-current signal in a range from 0 V to 25 V.

3. The method according to claim 2, further comprising connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

4. The method according to claim 1, further comprising connecting the high-frequency clock signal input end to a second signal providing end, wherein the second signal providing end is configured to provide a high-frequency clock signal to the high-frequency clock signal input end.

5. The method according to claim 4, wherein the second signal providing end provides an adjustable direct-current signal in a range from 0 V to 25 V.

6. The method according to claim 5, further comprising connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

7. The method according to claim 4. wherein the second signal providing end provides a −5 V direct-current signal.

8. The method according to claim 7, further comprising connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

9. The method according to claim 4, further comprising connecting the first low-frequency clock signal input end and the second low-frequency clock signal input end respectively to a third signal providing end, wherein the third signal providing end.

10. The method according to claim 1, further comprising connecting the first low-frequency clock signal input end and the second low-frequency clock signal input end respectively to a third signal providing end, wherein the third signal providing end is configured to provide a low-frequency clock signal to the first low-frequency clock signal input end and the second low-frequency clock signal input end.

11. The method according to claim 10, wherein the third signal providing end provides an adjustable direct-current signal in a range from 0 V to 25 V.

12. The method according to claim 10, wherein the third signal providing end provides a −5 V direct-current signal.

* * * * *